United States Patent
Graham et al.

(10) Patent No.: US 10,318,620 B2
(45) Date of Patent: *Jun. 11, 2019

(54) GENERAL PURPOSE ANNOTATION SERVICE FOR PORTAL-BASED APPLICATIONS

(71) Applicant: International Business Machines Corporation, Armonk, NY (US)

(72) Inventors: John S. Graham, Raleigh, NC (US); Prasant K. Kantamsetty, Cary, NC (US); Shankar Ramaswamy, Chapel Hill, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 403 days.

This patent is subject to a terminal disclaimer.

(21) Appl. No.: 14/984,283

(22) Filed: Dec. 30, 2015

(65) Prior Publication Data

US 2016/0117302 A1   Apr. 28, 2016

Related U.S. Application Data

(63) Continuation of application No. 11/148,830, filed on Jun. 9, 2005, now Pat. No. 9,235,560.

(51) Int. Cl.
| | | |
|---|---|---|
| *G06F 17/00* | (2019.01) | |
| *G06F 17/24* | (2006.01) | |
| *G06F 3/0482* | (2013.01) | |
| *G06F 3/0484* | (2013.01) | |
| *H04L 29/06* | (2006.01) | |

(52) U.S. Cl.
CPC ......... *G06F 17/241* (2013.01); *G06F 3/0482* (2013.01); *G06F 3/04842* (2013.01); *H04L 63/10* (2013.01)

(58) Field of Classification Search
CPC .................. G06F 17/30011; G06F 17/241
USPC ................. 715/230, 232, 233, 715
See application file for complete search history.

(56) References Cited

U.S. PATENT DOCUMENTS

| | | |
|---|---|---|
| 6,212,534 B1 | 4/2001 | Lo et al. |
| 6,320,597 B1 | 11/2001 | Ieperen |
| 6,415,284 B1 | 7/2002 | D'Souza et al. |
| 6,859,909 B1 | 2/2005 | Lerner et al. |
| 6,950,852 B1 | 9/2005 | Kobayaghi et al. |

(Continued)

OTHER PUBLICATIONS

Hunter, J., "New Features Added to Servlet 2.5" [online] Java World, Inc. © 1995-2008, Jan. 2, 2006, retrieved from the Internet: <http://www.javaworld.com/javaworld/jw-01-2006/jw-0102-servlet.html>, 9 pg.

(Continued)

*Primary Examiner* — Manglesh M Patel
(74) *Attorney, Agent, or Firm* — Cuenot, Forsythe & Kim, LLC

(57) ABSTRACT

A method of providing annotations within a portal environment can include executing a portlet object having a tag, wherein the tag specifies an annotation service associated with an artifact presented by a graphical user interface of the portal environment. A visual identifier can be presented proximate to the artifact. The visual identifier can reference the annotation service. The method further can include creating an annotation using the annotation service responsive to the selection of the visual identifier.

18 Claims, 3 Drawing Sheets

(56) References Cited

U.S. PATENT DOCUMENTS

| | | |
|---|---|---|
| 7,242,389 B1 | 7/2007 | Stern |
| 7,284,191 B2 | 10/2007 | Grefenstette et al. |
| 7,284,192 B2 | 10/2007 | Kashi et al. |
| 7,506,246 B2 | 3/2009 | Hollander et al. |
| 7,734,685 B2 | 6/2010 | Cheng et al. |
| 9,235,560 B2 | 1/2016 | Graham et al. |
| 2002/0019837 A1 | 2/2002 | Balnaves |
| 2002/0065912 A1 | 5/2002 | Catchpole et al. |
| 2003/0100995 A1 | 5/2003 | Loraine et al. |
| 2003/0126094 A1 | 7/2003 | Fisher et al. |
| 2004/0088332 A1 | 5/2004 | Lee et al. |
| 2004/0107249 A1 | 6/2004 | Moser et al. |
| 2004/0138946 A1 | 7/2004 | Stolze |
| 2004/0143590 A1 | 7/2004 | Wong et al. |
| 2004/0143796 A1 | 7/2004 | Lerner et al. |
| 2004/0174392 A1 | 9/2004 | Bjoernsen et al. |
| 2004/0225959 A1 | 11/2004 | D'Orto et al. |
| 2005/0060353 A1 | 3/2005 | Tan et al. |
| 2005/0144305 A1 | 6/2005 | Fegen et al. |
| 2005/0198202 A1 | 9/2005 | Yamamoto |
| 2005/0216457 A1 | 9/2005 | Walther et al. |
| 2005/0256866 A1 | 11/2005 | Lu et al. |
| 2006/0026251 A1 | 2/2006 | Cheng et al. |
| 2006/0218485 A1 | 9/2006 | Blumenthal |
| 2006/0282819 A1 | 12/2006 | Graham et al. |
| 2008/0005064 A1 | 1/2008 | Sarukkai |
| 2008/0052369 A1 | 2/2008 | Weber et al. |

OTHER PUBLICATIONS

U.S. Appl. No. 11/148,830, Non-Final Office Action, dated Apr. 18, 2008, 9 pg.

U.S. Appl. No. 11/148,830, Final Office Action, dated Oct. 7, 2008, 10 pg.

U.S. Appl. No. 11/148,830, Non-Final Office Action, dated Jul. 23, 2010, 19 pg.

U.S. Appl. No. 11/148,830, Non-Final Office Action, dated Jan. 5, 2011, 18 pg.

U.S. Appl. No. 11/148,830, Final Office Action, dated Jun. 8, 2011, 21 pg.

U.S. Appl. No. 11/148,830, Examiner's Answer to Appeal Brief, dated Nov. 28, 2011, 22 pg.

U.S. Appl. No. 11/148,830, Decision on Appeal, dated Nov. 28, 2014, 9 pg.

U.S. Appl. No. 11/148,830, Notice of Allowance, dated Aug. 28, 2015, 7 pg.

GENERAL PURPOSE ANNOTATION SERVICE FOR PORTAL-BASED APPLICATIONS

BACKGROUND

Field of the Invention

The present invention relates to information management and, more particularly, to annotating software objects with supplemental information.

Description of the Related Art

Within the context of information technology, annotations generally refer to the attachment or association of supplemental information to a portion of user-supplied data. In illustration, one variety of annotation system pertains to word processing applications. Modern word processing applications typically allow users to select a given portion of text from within a word processing document. The selected text then can be associated with an annotation, usually in the form of a comment. Comments include additional user supplied text which is visually distinguishable from the regular text of the electronic document. For example, comments often are distinctively highlighted and placed in the document margin proximate to the text to which the comment has been associated. Such annotation schemes frequently mimic the manner in which people manually mark-up or edit paper-based documents.

While annotations of this sort can be helpful in terms of providing additional commentary for a portion of text, limitations do exist. One limitation is that conventional annotation frameworks used within word processing applications do not provide a means for regulating which users are provided access to a given comment. Annotations also are limited to a single type, i.e. a comment which serves an explanatory function. Further, annotations used within word processing applications can only be associated with the content of an electronic document. That is, the annotations cannot be associated with other software objects such as elements of the graphical user interface (GUI) of the word processing application.

Another variety of annotation scheme provides supplementary Universal Resource Locators (URLs) for selected Web pages. Such annotation schemes attempt to associate particular URLs, or Web addresses, with one or more other related URLs. When a user accesses or downloads a given Web page, the user can be alerted that one or more other URLs are available which may provide further information in addition to that which is included in the user-requested Web page. The user then can choose whether to access that supplemental content.

Annotation systems of the variety described above typically require the user to download a program, referred to as a plug-in. The plug-in executes in concert with the user's browser and monitors the URLs requested by the user. These URLs are compared with a listing of URLs available from an online service that is accessed by the plug-in. If a user-requested URL is associated with one or more other URLs listed in the online service, the user can be notified.

This sort of Web-based annotation system also has disadvantages. One disadvantage is the need for the user to download and execute a third-party application. Additionally, as was the case with word processing-type annotation systems, conventional annotation systems for Web pages typically perform a single, limited function. In this case, that function is to associate a URL with another URL. Other limitations of Web-based annotation systems include the inability to regulate annotations based upon user identity, enforce security policies, or perform more varied programmatic functions using annotations.

It would be beneficial to provide an annotation service which overcomes the deficiencies described above, thereby providing increased flexibility in terms of the type of annotation that can be created and the type of software object with which an annotation can be associated.

SUMMARY OF THE INVENTION

The present invention provides a solution for providing and using annotations within a portal-based computing environment. One embodiment of the present invention can include a method of providing annotations within a portal environment. The method can include executing a portlet object having a tag. The tag can specify an annotation service associated with an artifact presented by a graphical user interface of the portal environment. A visual identifier can be presented proximate to the artifact. The visual identifier can reference the annotation service. The method further can include creating an annotation using the annotation service responsive to a selection of the visual identifier.

Another embodiment of the present invention can include a method of providing annotations within a portal environment. The method can include presenting a visual rendering of a portlet, wherein the visual rendering comprises a visual identifier and an associated artifact. The visual identifier can indicate the availability of at least one annotation service for annotating the artifact. The method further can include presenting a menu for accessing the at least one annotation service responsive to a selection of the visual identifier and performing a programmatic action corresponding to an annotation service selected from the menu.

Yet another embodiment of the present invention can include a machine readable storage being programmed to cause a machine to perform the various steps described herein.

BRIEF DESCRIPTION OF THE DRAWINGS

There are shown in the drawings, embodiments which are presently preferred; it being understood, however, that the invention is not limited to the precise arrangements and instrumentalities shown.

DETAILED DESCRIPTION OF THE INVENTION

The present invention provides a flexible annotation service within the context of a portal-based application. The present invention provides a general annotation service through which annotations can be associated with various artifacts, whether data, graphical user interface (GUI) elements, or various combinations thereof, that are presented within a portal environment. In accordance with the inventive arrangements disclosed herein, annotations of varying types can be developed and included within portlet objects. The annotation type can be determined largely based upon the particular programmatic action or function that an annotation is to perform, whether serving as a vehicle for adding commentary to an object, attaching files or documents to an object, sending an electronic mail or other communication, or the like. The annotation service disclosed herein further provides an architecture for regulating access to annotations and/or the functions associated therewith according to user identities.

Figure 1:
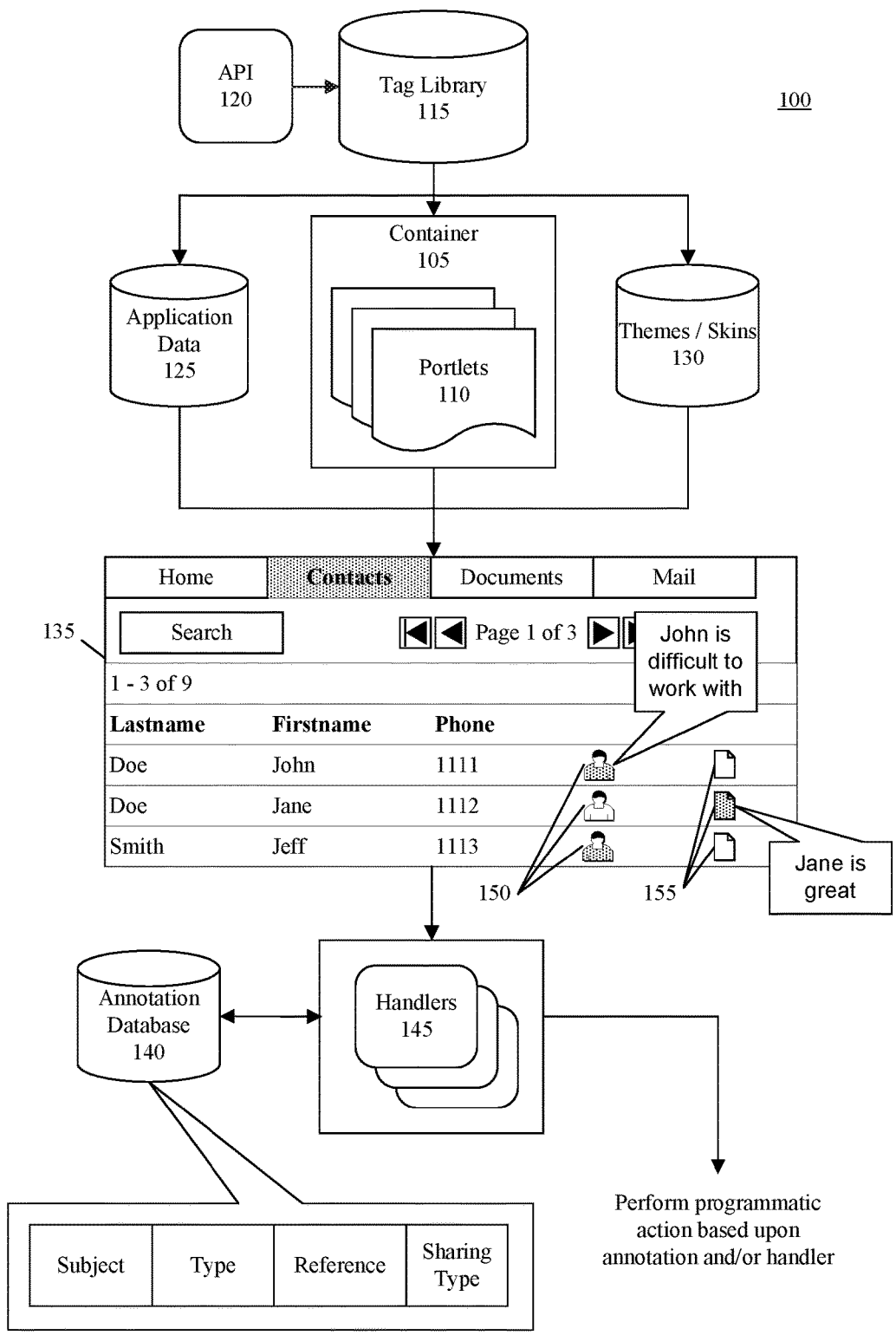
FIG. 1 is a block diagram illustrating a portal environment which includes an annotation service in accordance with one embodiment of the present invention.

FIG. 1 is a block diagram illustrating a portal environment 100 which includes an annotation service in accordance with one embodiment of the present invention. The portal environment 100 can include a container 105 having one or more portlets 110, a tag library 115, an application programming interface (API) 120, application data 125, and a themes/skins data store 130. The portal environment 100 further can include a GUI 135, an annotation database 140, and a plurality of handlers 145. In one embodiment of the present invention, the portal environment 100 can be implemented as Websphere® Portal, which is a software product that is commercially available from International Business Machines Corporation of Armonk, N.Y.

The portal environment 100 provides a simple, unified access point, i.e. a portal, through which a variety of functions can be accessed. Although the term "portal" can be used in reference to Web-based applications, this need not be the case. The portal environment 100 can refer to an application that provides content and/or functionality aggregation regardless of whether the Web or markup language(s) are used. The portal environment 100 can provide some degree of personalization, user sign-on, as well as host the presentation layer of an information system.

The portal environment can be configured to provide annotation services for creating, deleting, modifying, and administering annotations. The annotations, once created, can be stored within the annotation database 140. Each annotation can be formed of a collection of one or more attributes. These attributes can include, but are not limited to, a subject, a type, a reference, and a sharing type. It should be appreciated that while annotations can be associated with attributes, attributes also can be associated with annotation services. For example, an annotation service can be configured to create annotations having one or more predetermined attributes as will be discussed herein in greater detail. Further, annotations and/or annotation services can be selectively made available based upon user access privileges, time, and/or other attributes.

The subject of an annotation uniquely identifies the particular object with which the annotation is associated or to which the annotation pertains. Annotations can be associated with artifacts presented within GUI 135 of the portal environment 100. As used herein, an artifact can be a data object from the application data 125 that is presented within the GUI 135 or a control element that is part of GUI 135, for example as provided by a portlet. Thus, the subject can be an identifier that uniquely identifies the subject of the annotation, i.e. the artifact. In one embodiment, the subject can be a primary key indicating the location of the associated data object from within a data store, i.e. the application data 125. In another embodiment, the subject can be a universal resource identifier (URI), a URL, or path which specifies the subject of the annotation.

The annotation type can be a character string which can be used to classify the annotation. In general, the annotation type indicates the purpose or functionality of the annotation. While one or more standard annotation types can be provided in the portal environment 100, additional custom or user-specified annotation types can be defined. Any of a variety of different annotation types can be defined. Examples of annotation types can include, but are not limited to, "note" for defining supplemental information, "comment" or "feedback" for purposes of review or critique, "link" for specifying a link to a Web page, portal, or portlet, "document" for specifying a particular document, "keyword" for adding one or more keywords to an object, "hint" for specifying how to use or access a particular feature, etc.

Additional types can be defined with more specific meaning such as "IM Transcript" indicating that an instant messaging (IM) transcript is associated with the annotation, "Audio" for indicating that an audio file is associated with the annotation, "send by email" for sending an artifact as an electronic mail attachment, etc. In any case, each annotation type can be defined as a string which signifies the particular function or purpose of the annotation. Each annotation type can be associated with its own handling logic, in particular a selected handler 145. A specific handler 145 can be selected according to annotation type, or annotation service type, as the case may be. Notwithstanding, it should be appreciated that any one annotation can be associated with its own specific handler, if so desired, thereby overriding a global type handler assignment within the portal environment 100.

The annotation reference can be an identifier which uniquely specifies the software object that contains the substance of the annotation. That is, the annotation reference can be a path, URL, URI, primary key of a database, etc., which specifies a software object, such as a text file, audio file, image, or the like. If for example, the annotation is a note, the annotation reference can specify the file which includes the text of the note.

The sharing type can indicate how a particular annotation is to be shared within the portal environment 100 among users. Annotations can be classified as private, public, or role-based. A private annotation is only available to the user that created the annotation. By comparison, a public annotation is available to all users of the portal environment 100. A role-based annotation is available to any person that has been associated with a particular role, i.e. managerial, legal, engineer, or the like. It should be appreciated that in the case of a private annotation type, the sharing type can indicate the identity of the person that created the annotation such that privacy can be enforced with the portal environment 100 with respect to annotations. Accordingly, the sharing type provides various categories of access control starting with the most coarse (public) level, to an intermediate level (role-based), and continuing to the most detailed (private) level.

While the annotations can include the aforementioned attributes, this listing is not intended to be exhaustive. Other attributes also can be included as part of an annotation within the annotation database 140. For example, a time-sensitive expiration value can be assigned to an annotation or annotation service. The time-sensitive attribute can indicate a date, time, or both, when the annotation or annotation service is to expire. When the expiration time and/or date is reached, the annotation or annotation service can be deleted or otherwise made unavailable to users. This allows time sensitive annotations to be created and automatically removed when such annotations are no longer relevant within the portal environment 100.

For example, expirations can be used in conjunction with annotation types specific to a particular project or for annotations relating to user qualifications or skill sets for which the user must undergo periodic training. Project specific annotations can be configured to expire upon an anticipated completion date of the project. Annotations relating to user skill sets can be set to expire at some future time when it is expected that the user will require a refresher course or other form of continuing education.

In another embodiment, a time-based attribute can indicate when a particular annotation or annotation service is to become active or made available. Thus, when an annotation service is not relevant, such services can be hidden or made unavailable until an appropriate time as indicated by the time-sensitive attribute.

In yet another embodiment, an annotation attribute can indicate that an annotation is to be created only one time by a given user and is not to be altered or changed subsequent to the creation of the annotation. Such an attribute can be used, for example, in the case where an annotation service is used in the context of polling users or rating content. In illustration, after a user completes an online course, a time-based attribute can indicate that an annotation service, through which the user rates the course, can become active. Prior to the designated time or date, or the completion of the online course, the annotation service would be unavailable to the user. In any case, once the user uses the annotation service to rate the online course, an attribute which indicates that the annotation service is to be used only one time by a given user can cause the annotation service to be made unavailable to the user and can protect the annotation itself from subsequent editing.

The portlets 110 are applications which can be accessed from within the portal environment 100. In general, each portlet 110 can serve as a reusable component which can execute within the container 105. In illustration, one portlet can provide a function such as document searching, another can provide for user login and/or security, and another can serve as an electronic mail client. Each portlet 110 can be considered a complete application which can follow a standard model-view-controller design. Each portlet 110 further can have multiple states and view modes, as well as event and messaging capabilities.

The container 105 provides a runtime environment in which the portlets 110 can be instantiated, executed, and destroyed. The container 105 further can provide the infrastructure, or access to the infrastructure, needed by portlets 110 for execution. Accordingly, the portlets 110 can rely on the infrastructure provided by the container 105 to access data elements within application data 125, participate in window and action events, communicate with other portlets 110, lookup credentials, store persistent data, access annotations within the annotation database 140, call handlers 145, and the like.

The themes/skins database 130 can include a plurality of different themes and skins. Generally, a theme is a software construct which defines appearance information for a portlet 110, or portal, as the case may be. For instance, a theme can specify the fonts, colors, spacing, and other visual elements to be used when presenting a given portlet 110. A theme can be configured as cascading style sheets, Java® Server Pages (JSP®) files, images, and the like. A skin can define the decorations and controls that may be placed around a portlet 110. For example, a skin can define items such as title bars, borders, shadows, and the like.

The tag library 115 can include one or more tags, which serve as placeholders or references to annotation functions. In one embodiment, the tags can be JSP® tags. In any case, the tag library 115 can include one or more tags and associated code which implement, at least in part, the annotation services described herein. Each tag can be included, or inserted, within a portlet object. As used herein, a portlet object can refer to a portlet, a theme, a skin, or another component and/or element of a portal. When a portlet object having a tag is executed or rendered, code associated with the tag is inserted into the portlet object in place of the tag. This code provides the annotation functionality to be described in greater detail.

As noted, because tags can be included within the portlet objects, tags can be associated with any artifacts displayed by a portlet 110 or as part of a portlet 110. This allows annotations to be associated with, for example, a GUI element, such as a button, text box, menu, or the like, items of data from the application data 125 that are presented by a portlet 110, or combinations thereof.

When executed, a portlet 110 can be executed and visually rendered within GUI 135. While a given portlet 110 can occupy the entire space of GUI 135, it also is possible to present a plurality of portlets 110 within GUI 135 concurrently. Accordingly, GUI 135 depicts a visual rendering of a portlet 110 after execution. The portlet 110 presents a listing of contact information taken from application data 125. In this case, one or more tags have been included in portlet objects rendered in GUI 135 to provide for various annotation services to be performed in relation to the displayed artifacts.

The code which is associated with a given tag in the tag library 115 can specify a particular visual identifier, or icon, which can be presented within a rendered portlet to signify that an annotation service is available for the artifact that is proximate to, or associated with, the visual identifier. The code further can specify a particular handler 145 which can be called upon selection of the visual identifier. The handlers 145 implement the programmatic actions that are performed when a visual identifier for an annotation service is selected.

In accordance with the present invention, when portlet objects are developed for use within the portal environment 100, one or more tags can be included therein. While developers can include the tags manually, i.e. by directly coding the tags as part of the source code of the portlet object, in another embodiment of the present invention, the API 120 can be used. API 120 provides developers with a less formal way of including annotation service functionality within portlet objects. The API 120 can be used, for example, by developers desiring a more visual interface for including annotation functionality within a portlet object. The API 120 also facilitates the creation of custom tags within the system by facilitating the development of appropriate handlers 145.

As shown with reference to GUI 135, each contact has been associated with a visual identifier 150 and 155. Visual identifiers 150 are associated with one particular annotation service while visual identifiers 155 are associated with another annotation service. As noted, the existence of an identifier within a portal GUI can indicate the availability of a particular annotation function or service in relation to an artifact. The appearance of the visual identifier further can indicate the type of annotation service that is available. The artifact, or subject for which the annotation service is available, is located next to, or proximate to, the visual identifier. In this case, each contact serves as the subject and has been associated with visual identifiers 150 and 155 indicating that two annotation services are available for each contact.

The appearance of the visual identifiers 150 and 155 can provide further information beyond that described above. In one aspect, the appearance of an identifier can be changed to indicate whether an annotation has been created and associated with the subject. The appearance of the identifier further can be changed to provide additional information relating to any of the attributes of an annotation that has been created as well as an annotation service that is available such as annotation type, reference, sharing type, and the like.

Visual identifier 150, for example corresponding to John Doe, can indicate the availability of an annotation service for adding private comments that will be associated with contact information stored in the application data 125 for John Doe. The contact information for John Doe will be identified as the subject for such an annotation. The sharing type for annotations created through this service will be "private". As noted, private annotations are only available to and/or viewable by the user that created the annotation. Thus, when a user logs onto the portal environment 100 and accesses the contact list as shown, the user can add a private comment to John Doe by selecting the identifier 150 which corresponds to John Doe.

In this case a user, referred to as User A, has added a comment indicating that "John is difficult to work with". The private comment will only be available to User A, the user that created the private comment. Once entered, the appearance of the identifier 150 can be changed to indicate to User A that a private comment now exists for John Doe. The appearance of the identifier 150 for John Doe can be contrasted with the identifier 150 for Jane Doe, which indicates that User A has created no private comment for Jane Doe. Still, as noted, the presence of identifier 150 proximate to Jane Doe indicates that a private comment annotation service is available.

Because the comment for John Doe is private, another user, i.e. User B, logging onto the portal environment 100 will be presented with identifiers 150 which indicate only whether User B created a private comment for any given contact. User B would be unaware of the existence of the private comment entered by User A and be unable to see the private comment of User A which states that "John is difficult to work with".

When identifier 150 is selected for John Doe, the handler 145 that is associated with the selected identifier and annotation service is called. The handler can perform a programmatic action such as launching a text editor, or the like, through which text or other commentary can be specified. The text can be saved as a file. The resulting annotation can include a subject that specifies John Doe or references the profile information for John Doe within the application data 125, an annotation type of comment, a reference to the file including the comments, and a sharing type of private. As noted, the sharing type further can specify the particular user that created the private comment to prevent other users from viewing or otherwise accessing the private comment.

Identifiers 155, for example, can correspond to an annotation function which creates public comments for the contacts. As noted, public comments can be made available to all users. The existence of identifiers 155 indicates the availability of the annotation service for each contact which has been associated, or is located next to, one of the identifiers 155. The appearance of identifiers 155 further can be changed to indicate whether a public comment has been created for a contact. In this case, a public comment has been created for Jane Doe, which is reflected by the appearance of identifier 155 which corresponds to her.

Selection of identifier 155 after creation of the annotation recalls the annotation which indicates that "Jane is great". More particularly, selection of identifier 155 causes an appropriate handler 145 to be called which determines that an annotation exists for Jane Doe and the selected identifier 155. Accordingly, the handler 145 can access the annotation from the annotation database 140 and launch a viewer and/or editor allowing the public comments associated with Jane Doe to be viewed. Because the comment is public, other users can add further information to the comment.

Figure 2:
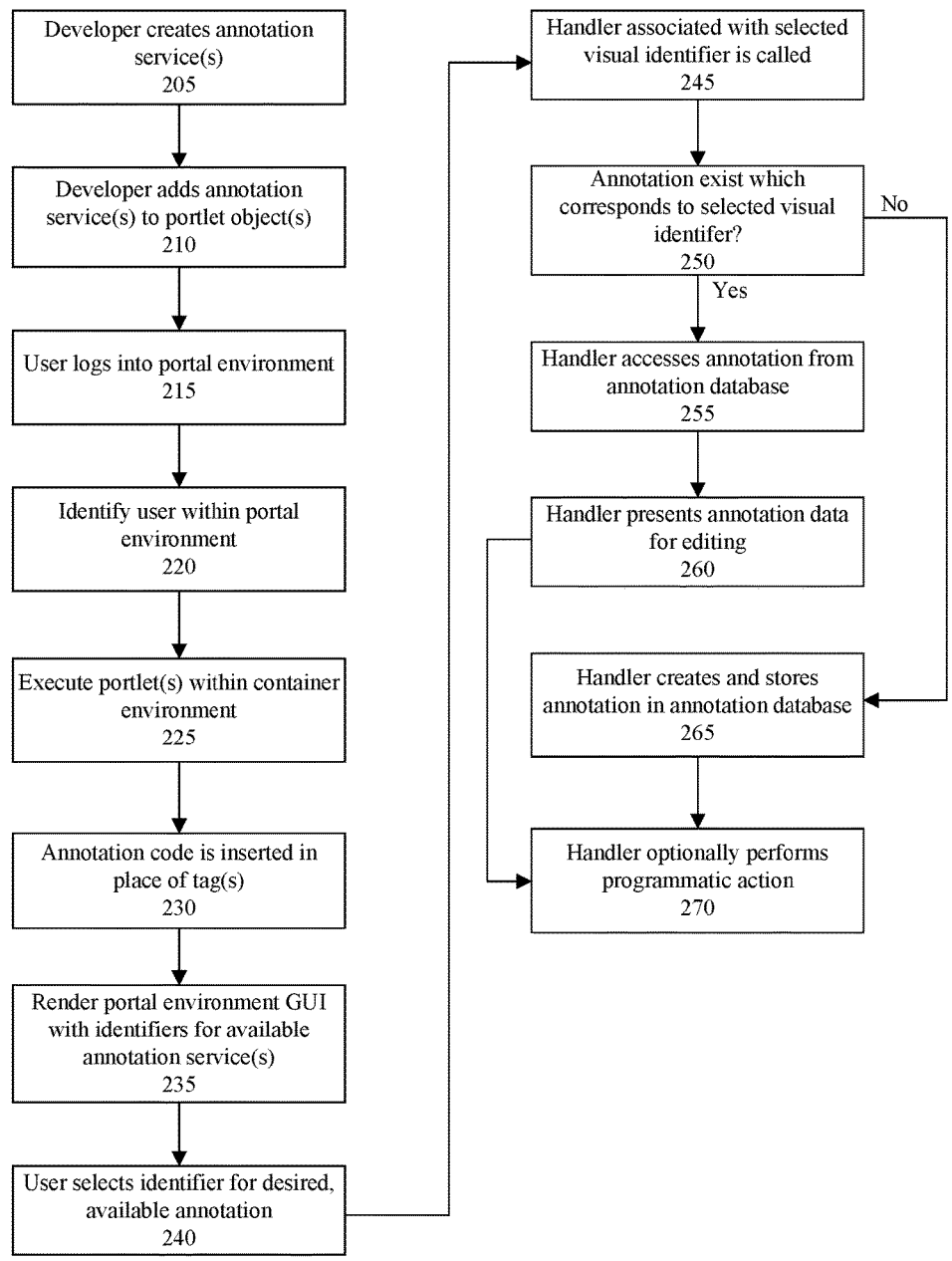
FIG. 2 is a flow chart illustrating a method of providing an annotation service in accordance with another embodiment of the present invention.

FIG. 2 is a flow chart illustrating a method of providing an annotation service in accordance with another embodiment of the present invention. The method can be performed within the context of a portal environment, such as the one depicted in FIG. 1. The method can begin in a state where the portal environment provides one or more annotation services as well as an API for accessing such services, editing the annotation services, and/or creating new annotation services.

Accordingly, in step 205, a developer, if so desired, can access the portal environment API and create one or more new annotation services. In doing so, the developer can define a new tag to be included within the tag library and the corresponding code that is inserted into a portlet object in place of the tag when the object is executed or rendered. An appropriate handler for the tag also can be created, if necessary.

In step 210, an annotation service can be added to a portlet object. More particularly, while developing a portlet object, a tag, whether default or custom, from the tag library can be included within the portlet object. To include a tag, the API can be used or the tag(s) can be coded directly into a portlet object in a manual fashion. After one or more annotation services are specified for various portlet objects within the portlet environment, users can begin using the portal and accessing any annotation services associated with rendered portlets.

In step 215, a user can log into the portal environment. In step 220, the user is identified within the portal environment along with any access privileges associated with that user. Accordingly, in step 225, one or more portlets can be executed. The appropriate portlets accessed by the user through the portal can be executed within the container environment. In step 230, as part of the portlet execution process, each tag included within the various portlet objects being executed in the container environment can be replaced with the associated code specified by the tag library.

In step 235, the portal environment GUI can be rendered. The code inserted into the portlet objects in place of the tags specifies any visual identifiers to be presented for accessing available annotation services along with the particular location of such identifiers within the GUI. That is, in addition to determining whether annotation services exist for particular artifacts, the annotation database can be consulted to determine whether annotations have been created for artifacts of the GUI, whether private or public. The visual identifiers can be presented within the GUI and can be located proximate to each artifact for which the corresponding annotation service is made available or for which an annotation has been created. The artifacts, as noted, will become the subject of any annotation created by selecting the associated identifier. This allows annotation services to be associated with data, GUI elements of the portlets, or any combination thereof.

If private annotations have been created for a displayed artifact by the identified user, the existence of those annotations can be indicated through an appropriate identifier, i.e. the appearance of the identifier. It should be appreciated that only those annotations that are accessible for a given user are indicated. Thus, any private annotations created by the identified user can be illustrated by an appropriate visual identifier, while private annotations for other users are not indicated and are not accessible. Further, in the case where one or more annotations include expiration information, only those annotations that have not expired, whether private or public, are indicated through an appropriate visual identifier.

In step 240, a user can select an identifier for an annotation service that is displayed within the portal GUI. Once selected, the handler associated with the selected visual identifier can be called in step 245. The code that is inserted into the portlet object in place of the tag can identify and call the appropriate handler. The handler, as noted, can include the logic and functions necessary for implementing the annotation service represented by the visual identifier. In step 250, a determination can be made as to whether an annotation has been created for the selected visual identifier. If so, the handler can determine that the user wishes to edit the existing annotation and proceed to step 255. If no annotation has been created, the handler can determine that the user wishes to create a new annotation, in which case the method can proceed to step 265.

Continuing with step 255, in the case where an annotation does exist, the handler can access the annotation database and locate the annotation associated with the selected visual identifier. In step 260, the handler can present the annotation data within an appropriate editor thereby allowing the user to alter or modify the annotation data. Thus, if the annotation was a comment or a note, the text of the comment or note can be presented within a suitable text editor so that the user can edit the text and save the modified annotation. The modified annotation then can be saved to the annotation database.

In step 265, in the case where no annotation has been created for the selected visual identifier, the handler can perform a programmatic action to collect the annotation data. For example, the handler can execute an appropriate application, such as a text editor, thereby allowing the user to enter annotation data. The text editor can receive annotation data such as links corresponding to URLs, file locations etc, as well as comments, notes, keyword(s), and the like. In another embodiment, the handler can launch a form editor which allows the user to enter data for a particular form. The form can be designed to collect any of a variety of data suited to the annotation function or type. In any case, once the annotation data is entered by the user, the handler stores the annotation which includes an annotation subject, type, reference, and access type. The annotation data, i.e. the comment, note, or the like which is specified by the annotation reference, is stored as well. Because the identifier is intended to add a particular type of annotation, is associated with a particular artifact (subject), and has a defined sharing type, these attributes can be determined automatically.

In step 270, the handler can perform any of a variety of different programmatic actions. Since the handler is selected according to the type of the annotation and/or service, the handler can be programmed to perform a desired programmatic action based upon the type of the annotation service that was accessed or the type of annotation that was accessed or created. In illustration, in the case where the annotation specifies a rating for content, the annotation type can be "rating". In this case, once the user has entered the appropriate rating information and the annotation is created, the handler can update the rating of the content. More particularly, the handler can be programmed to incorporate the rating supplied by the newly created annotation into the overall rating for the content. Thus, if an online course or document was the subject of the user's rating, that rating can be added to the ratings from other users which correspond to the same document or online course. The handler can update the overall rating for the content in a database for example. The updated rating can be made available to other systems such as a document or course library.

Though programmatic actions can be performed automatically in the context of an annotation service as described above, in another embodiment, such actions can be selected by a user. It may be the case, for example, that several different actions are available, such as sending an IM, sending an electronic mail, compressing the annotation data, searching annotation data, launching a workflow, executing a Web service, or the like. If so, the user can be presented with a menu specifying the programmatic actions that are available for the annotation service that was executed. The user then can select one or more actions to be performed.

The present invention is not limited by the particular type of processing which can be performed. As noted, such processing can occur prior to the annotation being stored, after the annotation is stored or created, or when the data for an annotation is retrieved. For example, prior to storing an annotation, the data can be compressed if so desired. The example pertaining to updating ratings for content can be applied after the annotation is stored or created.

As noted, the type of visual identifier shown can indicate the type of annotation service that is invoked when the visual identifier is selected. That is, a note annotation service can be represented by one sort of visual identifier while a keyword annotation service can be associated with a different annotation service. In another embodiment, however, selection of a visual identifier can cause a menu to be presented which allows the user to select a particular type of annotation to be associated with the selected visual identifier, and corresponding artifact.

Figure 3:
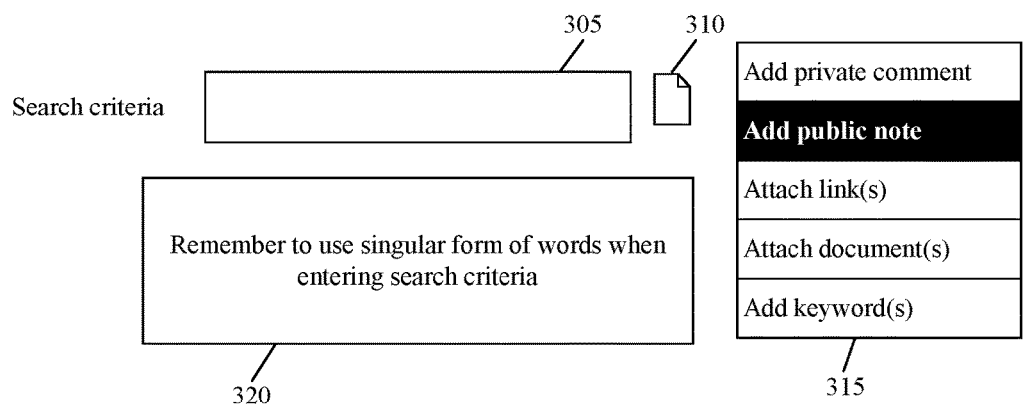
FIG. 3 is a block diagram illustrating a portion of a portal GUI in which a user can select a particular type of annotation service to be implemented in accordance with another embodiment of the present invention.

FIG. 3 is a block diagram illustrating a portion of a portal GUI in which a user can select a particular type of annotation service to be implemented in accordance with another embodiment of the present invention. As shown, an artifact, in this case a GUI data entry element 305, particularly a text field for receiving search criteria, has been associated with an annotation service. The availability of the annotation service is indicated by visual identifier 310. Responsive to selection of visual identifier 310, menu 315 can be displayed. Thus, rather than associating the text field 305 with a particular type of annotation service, in this embodiment, a user is permitted to select the type of annotation to be associated or created for the artifact 305.

As shown, the menu option for adding a public note has been selected. The selection of a menu option can cause a particular handler to be called. In this case, the handler can launch a text editor which can receive user supplied text, i.e. the note content. The note text is saved as a file that is referenced by the annotation created in the annotation database. Once created, the note can be accessed by selecting either visual identifier 310 or an additional visual identifier (not shown) which can be included in the portlet and associated with artifact 305. In another embodiment, the menu 315 can include an option for editing an existing annotation and/or deleting an existing annotation.

In any case, once the annotation is created, it can be stored within the annotation database for future reference and/or use. Subsequently, if a user were to conduct a search of within the help files or instructions included with the portal environment, annotations relating to GUI objects also could be searched or otherwise made available as part of the application help. Thus, users could view and search public help, comments, or notes pertaining to GUI elements or functions. Searching in this manner further can be limited to searching particular types of annotations such as "helpful hints" or the like. Further, only annotations which have not yet expired would be available for searching.

Figure 4:
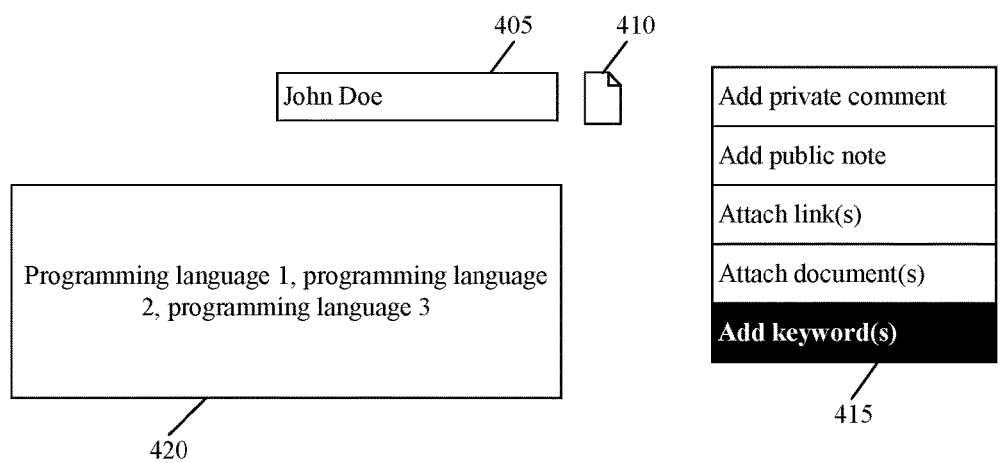
FIG. 4 is a block diagram illustrating a portion of a portal GUI in which a user can select a particular type of annotation service to be implemented in accordance with yet another embodiment of the present invention.

FIG. 4 is a block diagram illustrating a portion of a portal GUI in which a user can select a particular type of annotation service to be implemented in accordance with yet another embodiment of the present invention. The functionality demonstrated in FIG. 4 is substantially similar to that illustrated in FIG. 3, with several exceptions. In this case, visual identifier 410, which indicates the availability of an annotation service, has been associated and located proximate to an artifact 405 which is a data object that has been accessed by a portlet. The user has selected a menu option from menu 415 for adding one or more keywords. Accordingly, a text editor 420 can be opened which allows the user to add one or more keywords as may be appropriate. As shown, keywords have been entered into the text editor 420 which describe John Doe's proficiency with respect to several different programming languages. This information can be stored within a file that is referenced by the annotation created in the annotation database.

Subsequently, when searching within the portal environment, the content referenced by the annotations, i.e. the keywords, comments, and other supplemental information entered using an annotation service, can be searched just as conventional application data can be searched. Thus, in reference to FIG. 4, contact information can be searched to locate any contacts that conform with specified search criteria. The annotation service can determine the annotations stored in the annotation data store that correspond to the contacts.

The content referenced by the annotations, i.e. the notes, comments, and/or keywords, for example, can be searched to determine whether any of the annotations correspond to the search criteria. Searching further can be limited and/or filtered according to annotation type. This allows one to search only keywords, for example, for the existence of a particular keyword. If one were to search the contacts for the phrase "programming language 1" in an effort to find a person having such expertise, the portal environment would locate the annotation illustrated in FIG. 4 and return John Doe as a contact.

The present invention provides a general annotation framework for use within a portal environment. The examples and illustrations disclosed herein have been provided for purposes of illustration only, and as such, are not intended to limit the scope of the present invention. It should be appreciated that different annotation types and corresponding programmatic actions can be defined. For example, an annotation service can be defined which sends data objects or annotation information relating to a GUI element as an attachment to, or as the body portion of, an electronic mail message or instant message. In any case, the present invention allows annotations to be associated with data objects as well as GUI elements, provides annotations of varying type, and further provides for a measure of access control over annotations.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program, software application, and/or other variants of these terms, in the present context, mean any expression, in any language, code, or notation, of a set of instructions intended to cause a system having an information processing capability to perform a particular function either directly or after either or both of the following: a) conversion to another language, code, or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of providing an annotation within a portal environment, comprising:
   executing, within the portal environment, a portlet object having an artifact and a tag associated with the artifact;
   replacing the tag with annotation code associated with the tag;
   receiving a selection of a visual identifier within the portlet object; and
   invoking, based upon the received selection, an annotation service, wherein
   the annotation code specifies a handler and the visual identifier,
   the handler invokes the annotation service, and
   the annotation service presents the annotation associated with the artifact.

2. The method of claim 1, wherein
upon the selection of the visual identifier, a menu of annotation service options are presented for the artifact.

3. The method of claim 1, wherein
a determination is made whether the annotation is a private or public, and
the visual identifier is selectively displayed based upon the determination and an identity of a user accessing the portlet object.

4. The method of claim 1, wherein
an access type for the annotation is identified as public or private; and
access to the annotation within the portlet object is selectively restricted based upon the identified access type and an identity of a user attempting to access the annotation.

5. The method of claim 1, wherein
the annotation service determines that the artifact is not associated with any pre-existing annotation, and the annotation service presents a user interface for receiving, from a user accessing the portlet object, the annotation.

6. The method of claim 1, wherein
the annotation service determines that the artifact is associated with a pre-existing annotation, and
the annotation service presents a user interface for receiving, from a user accessing the portlet object, an edit to the pre-existing annotation.

7. A computer hardware system configured to provide an annotation within a portal environment, comprising:
at least one hardware processor configured to initiate the following executable operations:
executing, within the portal environment, a portlet object having an artifact and a tag associated with the artifact;
replacing the tag with annotation code associated with the tag;
receiving a selection of a visual identifier within the portlet object; and
invoking, based upon the received selection, an annotation service, wherein
the annotation code specifies a handler and the visual identifier,
the handler invokes the annotation service, and
the annotation service presents the annotation associated with the artifact.

8. The system of claim 7, wherein
upon the selection of the visual identifier, a menu of annotation service options are presented for the artifact.

9. The system of claim 7, wherein
a determination is made whether the annotation is a private or public, and
the visual identifier is selectively displayed based upon the determination and an identity of a user accessing the portlet object.

10. The system of claim 7, wherein
an access type for the annotation is identified as public or private; and
access to the annotation within the portlet object is selectively restricted based upon the identified access type and an identity of a user attempting to access the annotation.

11. The system of claim 7, wherein
the annotation service determines that the artifact is not associated with any pre-existing annotation, and
the annotation service presents a user interface for receiving, from a user accessing the portlet object, the annotation.

12. The system of claim 7, wherein
the annotation service determines that the artifact is associated with a pre-existing annotation, and
the annotation service presents a user interface for receiving, from a user accessing the portlet object, an edit to the pre-existing annotation.

13. A computer program product, comprising:
a computer readable storage device having stored therein a computer program code configured for providing an annotation within a portal environment,
the computer program code, which when executed by a computer hardware system, causes the computer hardware system to perform:
executing, within the portal environment, a portlet object having an artifact and a tag associated with the artifact;
replacing the tag with annotation code associated with the tag;
receiving a selection of a visual identifier within the portlet object; and
invoking, based upon the received selection, an annotation service, wherein
the annotation code specifies a handler and the visual identifier,
the handler invokes the annotation service, and
the annotation service presents the annotation associated with the artifact.

14. The computer program product of claim 13, wherein
upon the selection of the visual identifier, a menu of annotation service options are presented for the artifact.

15. The computer program product of claim 13, wherein
a determination is made whether the annotation is a private or public, and
the visual identifier is selectively displayed based upon the determination and an identity of a user accessing the portlet object.

16. The computer program product of claim 13, wherein
an access type for the annotation is identified as public or private; and
access to the annotation within the portlet object is selectively restricted based upon the identified access type and an identity of a user attempting to access the annotation.

17. The computer program product of claim 13, wherein
the annotation service determines that the artifact is not associated with any pre-existing annotation, and
the annotation service presents a user interface for receiving, from a user accessing the portlet object, the annotation.

18. The computer program product of claim 13, wherein
the annotation service determines that the artifact is associated with a pre-existing annotation, and
the annotation service presents a user interface for receiving, from a user accessing the portlet object, an edit to the pre-existing annotation.

* * * * *